United States Patent [19]

Lindsay

[11] Patent Number: 4,535,870

[45] Date of Patent: Aug. 20, 1985

[54] QUICK ATTACH-DETACH MECHANISM FOR AUDIO COMPONENTS

[75] Inventor: Paul H. Lindsay, Vernon, N.Y.

[73] Assignee: General Electric Company, Portsmouth, Va.

[21] Appl. No.: 671,624

[22] Filed: Nov. 15, 1984

[51] Int. Cl.$^3$ ............................................. G10K 10/00
[52] U.S. Cl. ..................................... 181/141; 181/145; 312/7.1; 179/146 E; 292/19
[58] Field of Search ........................ 181/141, 144–147; 179/146 E; 381/87, 88; 312/7.1, 7.2, 111; 292/19

[56] References Cited

U.S. PATENT DOCUMENTS

| 149,904 | 4/1874 | Weston | 292/19 |
|---|---|---|---|
| 261,356 | 6/1882 | Joyner | 292/19 |
| 1,139,316 | 5/1915 | Van Valkenburgh | 292/19 |
| 2,923,370 | 2/1960 | Capite | 181/145 |
| 3,966,242 | 6/1976 | Vitalis | 292/19 |
| 4,303,807 | 12/1981 | Sato | 179/146 E |

*Primary Examiner*—Benjamin R. Fuller

[57] ABSTRACT

A portable audio product having multiple components is provided with a quick attach detach mechanism that is adapted for one hand operation. The mechanism includes means for locking the components together in a vibration-free manner such that relative movement is prevented in the vertical, fore and aft, and rotational directions. Attachment and detachment is provided in the horizontal direction only.

12 Claims, 14 Drawing Figures

QUICK ATTACH-DETACH MECHANISM FOR AUDIO COMPONENTS

BACKGROUND OF THE INVENTION

1. Field of the Invention

This invention relates to apparatus for selectively securing separate audio components into an integrated unit and, more particularly, to an easily operated quick attach-detach mechanism that is capable of supporting relatively heavy loads in a vibration-free manner.

2. Description of the Prior Art

Portable stereo component systems are extremely popular today because of their versatility. Such systems comprise a central radio receiver component, which typically includes a cassette type player, and a pair of speakers detachably mounted on opposite ends of the radio receiver component. The receiver component includes a handle to enable the complete assembled system to be carried about as an integrated unit. Such systems may be operated as a single unit, or the speaker may be removed from the receiver component and located at a distance therefrom to enhance the stereo effect.

Various attachment mechanisms have been used in the past to connect and disconnect the stereo components. These prior art arrangements have tended to have various deficiencies. Some arrangements have been relatively difficult to operate, requiring multiple hand operations sequentially and/or simultaneously. Others have not been particularly strong or sturdy, allowing speakers to sag or pop off of the central receiver. Moreover, a common problem in portable component stereos heretofore has been undesired vibration during use as an integrated unit. It has been very difficult to both attach components in a sturdy and easy manner and prevent rattling and buzzing during operation. This is particularly true with respect to component systems having large and powerful speakers.

SUMMARY OF THE INVENTION

It is a primary object of the invention to provide in a portable stereo component system an improved mechanism for selectively attaching and detaching speakers to the central receiver component.

Another object of the invention is to provide for portable stereo component systems a quick attach-detach mechanism that is easy to see.

Yet another object of the invention is to provide for portable stereo component systems a mechanism operable with only one hand for selectively attaching and detaching speakers.

A further object is to provide for portable stereo component systems a quick attach-detach mechanism that is sturdy and capable of securely holding large and heavy speakers in a sag-free manner.

A still further object is to provide in a portable stereo component system an attachment arrangement for releasably securing speakers in a manner that substantially prevents vibration in the attachment and resulting rattling or buzzing during operation.

Briefly stated, in carrying out the invention in one form, a portable audio product including at least two components having separate housings is provided with a quick attach-detach mechanism for selectively locking the components into a substantially rigid and vibration-free integrated unit and for selectively releasing the components for stand-alone operation. The quick attach-detach mechanism includes a plurality of studs projecting outwardly from a first one of the housings along spaced-apart parallel axes. A second one of the housings has resilient means thereon to abut the distal ends of the studs when the components are positioned to form an integrated unit, the resilient means being resiliently compressible along the axes of the studs. A first locking means projects outwardly from a selected one of the housings along an axis parallel to the axes of the studs, and the first locking means has detent means thereon. A second locking means, carried by the non-selected one of the housings, has a first operative position adapted to engage the detent means only when the components are positioned to form an integrated unit with the resilient means substantially compressed to apply separating forces on the studs. The second locking means has a second operative position adapted to avoid engagement with the detent means in all relative positions of the components. A manual operating means movable between a latched position and an unlatched position is coupled to the second locking means such that the second locking means is in its first operative position when the manual operating means is in its latched position and in its second operative position when the manual operating means is in its unlatched position. The second locking means and the manual operating means are normally biased toward their respective first operative and latched position such that manual movement of the manual means to its unlatched position when the components comprise an integrated unit will move the second locking means to its second operative position to disengage the first locking means and permit separation of the components as a result of the separating forces exerted on the distal ends of the studs by the resilient means.

In accordance with further aspects of the invention, the first locking member is a cylindrical member having a groove therein forming the detent means, and the second locking means is an elongated resilient member movable into the groove in the first operative position and out of the groove in the second operative position. The resiliency of the elongated member biases the elongated member from its second operative position toward its first operative position. The cylindrical member includes cam means at its distal end for engaging the elongated member as the components are moved along the axis of the first locking means toward their positions to form an integrated unit to move the elongated member to its second operative position, whereby when the components reach a position in which the elongated member is axially aligned with the groove, the elongated member can enter the groove under the influence of its normal biasing force. By still further aspects of the invention, cam means are provided between the manual operating means and the elongated member for biasing the manual operating means toward its latched position and for moving the elongated member to its second operative position when the manual operating means is manually moved to its unlatched position. The elongated member comprises a pair of wire elements adjacent each other in the first operative position and substantially spaced apart and resiliently stressed in the second operative position. The lengths of the studs and the first locking means and the maximum deflection of the resilient means are selected to preclude contact between other portions of the adjacent housings when the components are positioned to form an integrated unit. The resilient means comprises a plurality of pads each positioned within a respective one of a plurality of recesses, each of which is sized and positioned to receive the distal end of a respective one of the studs.

BRIEF DESCRIPTION OF THE DRAWINGS

While the novel features of the invention are set forth with particularity in the appended claims, the invention, both as to organization and content, will be better understood and appreciated, along with other objects and features thereof, from the following description taken in connection with the drawings, in which:

DESCRIPTION OF A PREFERRED EMBODIMENT

Figure 1:
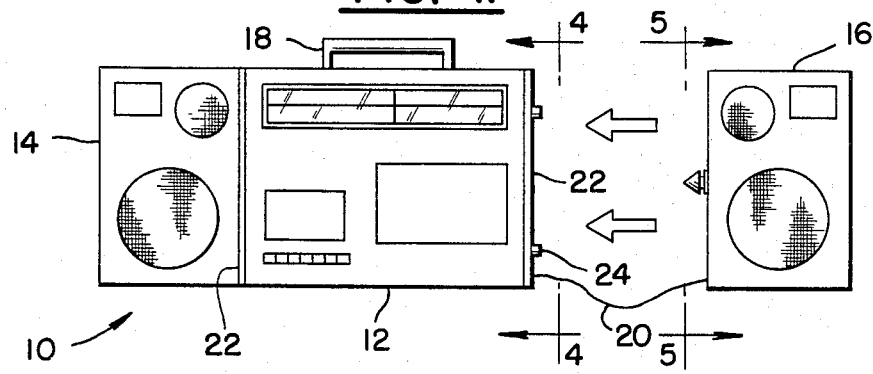
FIG. 1 is a front view of a portable stereo component system showing one speaker attached to the central receiver component by the quick attach-detach mechanism of this invention and the other speaker separated for stand alone operation.
Figure 2:
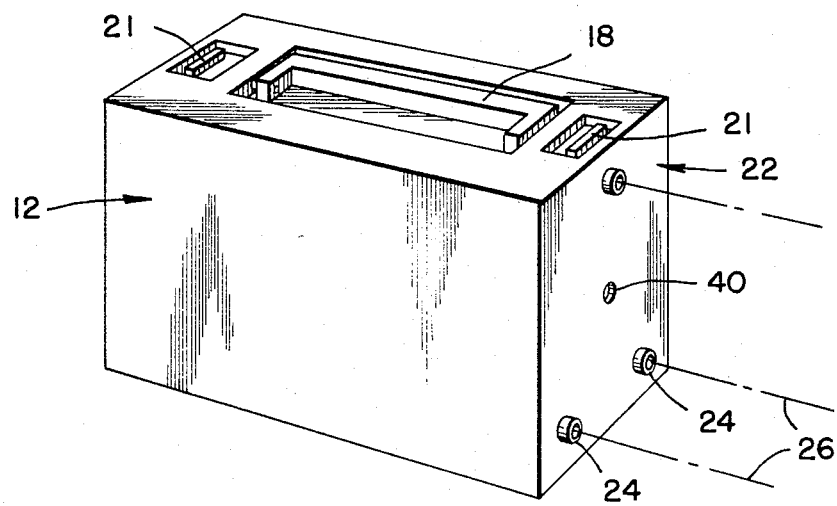
FIG. 2 is a perspective view of the right end of the receiver component of the stereo system of FIG. 1.
Figure 3:
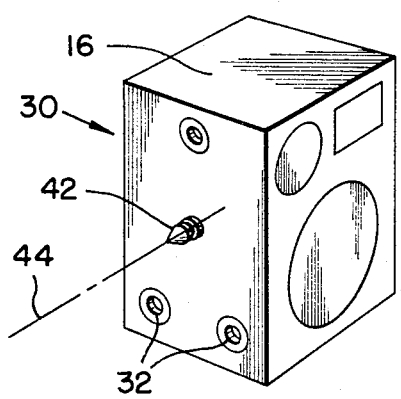
FIG. 3 is a perspective view of the right speaker of the stereo system of FIG. 1.

Referring first to FIG. 1, a component audio system 10 is illustrated. The audio system 10 including components 12, 14 and 16 which may be either joined together as illustrated by components 12 and 14 to form an integrated unit or separated as illustrated by components 12 and 16 to function as stand-alone units. The component 12 is typically a stereo radio receiver and tape player, and the components 14 and 16 are stereo speakers. The components may be joined together into an integrated unit and carried by means of a handle 18, or the speakers 14 and 16 may be removed from the receiver 12 to increase the separation therebetween, thereby enhancing the stereo effect. The speakers 14 and 16 are electrically connected to the receiver components by cables 20.

The present invention is directed to a quick attach-detach mechanism that enables the components to be quickly and easily assembled through simple horizontal movement toward each other. Disassembly as provided by merely depressing release buttons 21 on both sides of the central receiver component 12. The mounting mechanism of this invention provides a strong and secure coupling between the components that prevents relative movement therebetween in all modes other than the horizontal movement desired when coupling and decoupling the components. The quick attach-detach mechanism also prevents undesirable vibrations and rattles during operation of the stereo system 10 as an integrated unit.

Figure 6:
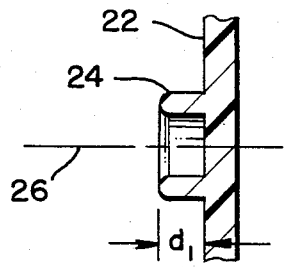
FIG. 6 is a view taken along viewing line 6—6 of FIG. 4.

Referring now to FIGS. 1-7, the receiver component 12 has formed on each end 22 thereof (only one end 22 shown throughout since the configuration is identical on opposite ends) three spaced-apart studs 24 which project outwardly therefrom along parallel axes 26 for a distance $d_1$ (FIG. 6). The axes 26 are preferably normal to the end surface 22 of the component 12. The studs 24 may be of hollow construction as illustrated for weight and material savings, but it will be understood that they may be of solid construction if desired without effect on the present invention. The adjacent end wall 30 of each of the speaker components 14 and 16 (only the component 16 shown throughout since the configuration is identical on both components 14 and 16) has an equal plurality of cylindrical recesses 32 formed therein and spaced-apart so as to axially align with respective ones of the studs 24 when the components are horizontally positioned to form an integrated unit. The recesses 32 have a diameter slightly larger than the diameter of the studs 24 so that the distal ends of the studs 24 may be received therein, as best shown by FIG. 12, when the components 10 and 16 are moved horizontally into engagement along the direction indicated by the arrows of FIG. 1.

Figure 7:
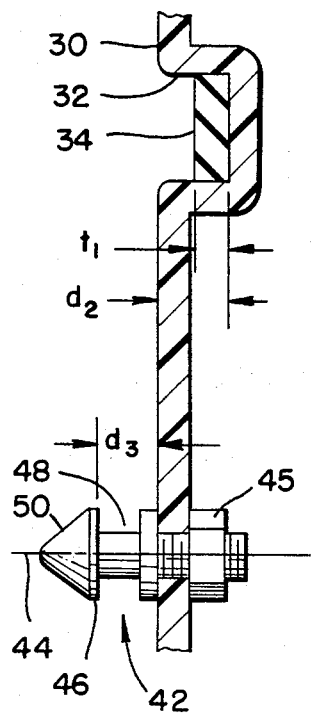
FIG. 7 is a view taken along viewing line 7—7 of FIG. 5.
Figure 12:
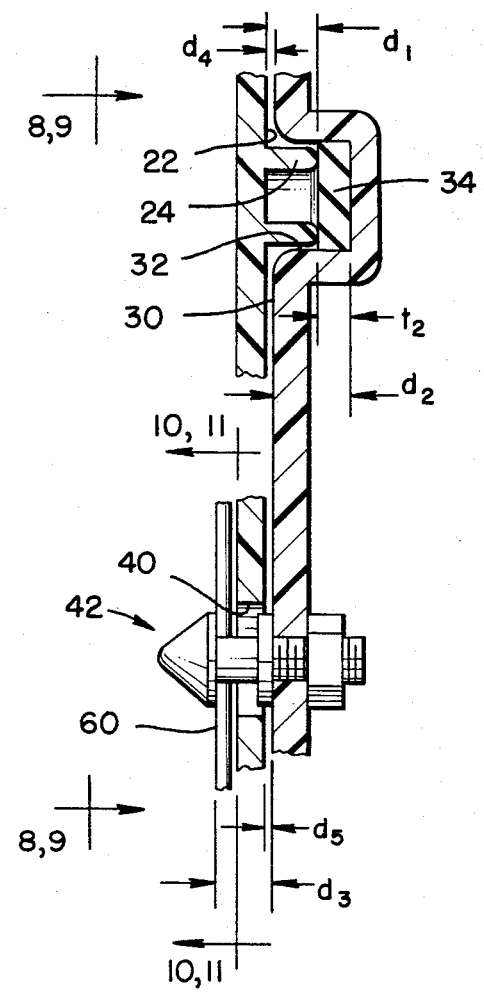
FIG. 12 is a view taken along viewing line 12—12 of FIG. 8 showing the components in their secured positions.

As best shown by FIGS. 7 and 12, each of the recesses 32 has a pad 34 of rubber or other resilient and compressible material located in the bottom of the recess 32. The depth of the recesses 32 is $d_2$, and the resilient pad 34 has an uncompressed thickness $t_1$ and a compressed thickness $t_2$. The significance of the dimensions $d_1$, $d_2$, $t_1$ and $t_2$ will be discussed at a later point in this description.

Figure 4:
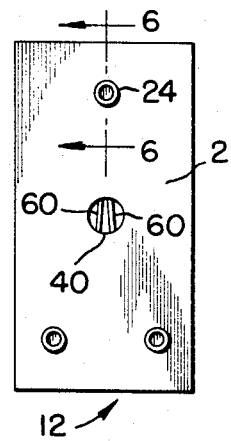
FIG. 4 is a right end view of the receiver component of FIG. 1.
Figure 5:
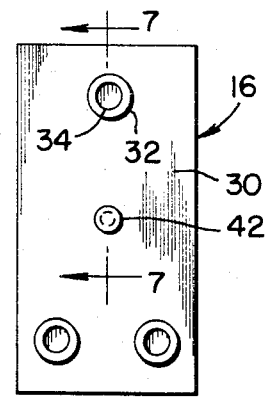
FIG. 5 is a left end view of the right speaker component of FIG. 1.

Referring now to FIGS. 2-7 and 12, the end wall 22 of the receiver component 12 has a circular opening 40 therein, and the end wall 30 of the speaker 16 has a locking member 42 extending therefrom along an axis 44 parallel to the axis 26 of the studs 24 when the components are horizontally aligned as illustrated by FIG. 1. The locking member 42 is fixedly secured to the component wall 30 by means of a suitable fastener such as a bolt 45. The locking member 42 in such alignment of the components is also aligned with opening 40 in the receiver component 12, the locking member 42 having a maximum diameter smaller than that of the opening 40 such that the locking member 42 can project into and through the opening 40. The locking member 42 has acylindrical outer surface 46 having a peripheral detent or groove 48 therein and a conical end surface 50 which acts as a cam means in a manner hereinafter described. The width and depth of the groove 48 is sufficient to receive another locking member in a manner described hereinafter, and the outer edge of the groove 48 is located a distance $d_3$ from the wall 30. The significance of the dimension $d_3$ will be described in connection with the dimensions $d_1$, $d_2$, $t_1$ and $t_2$. As shown by FIGS. 4 and 12, a pair of generally parallel wires 60 extend across the inner side of the opening 40 in a generally vertical alignment. When the stereo components are forced together horizontally along the direction of the arrows of FIG. 1, the studs 24 enter the respective recesses 32, and the distal ends thereof compress the pads 34. Simultaneously, the locking member 42 projects into and through the opening 40, and the tapered end 50 of the locking member 42, as the member 42 enters the opening 40, causes the wires 60 to separate slightly against a continuously applied biasing force urging the wires 60 to the position illustrated by FIGS. 4, 8, and 10. When the relative horizontal movement reaches the position illustrated by FIG. 12, the biasing force on the wires 60 causes them to snap into the groove 48 in the locking member 42 to lock the components into an integrated unit. Except in accordance with the release feature of the present invention, the components cannot be separated thereafter because of the engagement of the wires 60 in the peripheral groove 38.

The significance of the dimensions $d_1$, $d_2$, $d_3$, $t_1$, $t_2$ will now be explained. The compressed thickness $t_2$ of the pads 34 plus the length $d_1$ of the studs 24 must be somewhat greater than the depth $d_2$ of the recesses 32. As a result, the end walls 22 and 30 are spaced apart by a distance $d_4$ ($d_4 = d_1 + t_2 \, d_2$) at the studs and recesses. Similarly, the dimension $d_3$ of the locking member 42 must be selected to be somewhat greater than the combined thickness of the wires 60 and the end wall 22, the wires 60 substantially contacting the end wall 22. As a result, the walls 22 and 30 are spaced apart by a distance $d_5$ at the locking member 42. As indicated previously, the stereo components are assembled into an integrated unit by forcing them horizontally toward each other until the wires 60 snap into the groove 48. This action results in compression of the pads 34 by the distal ends of the studs 24, and the resilient, compressed pads thereafter exert forces on the studs 24 in a direction to separate the components. This force is opposed by forces exerted on the end wall of the groove 48 by the wires 60. Stated differently, he force exerted on the locking member 42 by the wires 60 balances the force that keeps the pads 34 compressed when the components are assembled into an integrated unit. Since the walls 22 and 30 must inherently have some flexibility, the dimension $d_5$ will in practice be somewhat smaller than the dimension $d_4$. Since wall thickness and rigidity may differ substantially from component to component, there are no exact formulas for establishing the various dimensions, except to state that they should be selected such that there is space ($d_5$) between the walls 22 and 30 at the locking member 42 and that the pads 34 are significantly compressed when the components form an integrated unit. The spacing $d_5$ and the inherent damping provided by the compressed pad 34 assures that there will be a minimum possibility of vibration, buzz, or rattle in the coupling or between adjacent housings during the operation of the stereo system. In addition, the compressed pads 34 provide the necessary separating forces over a sufficient distance when it is desired to separate the components for stand alone operation.

Figure 8:
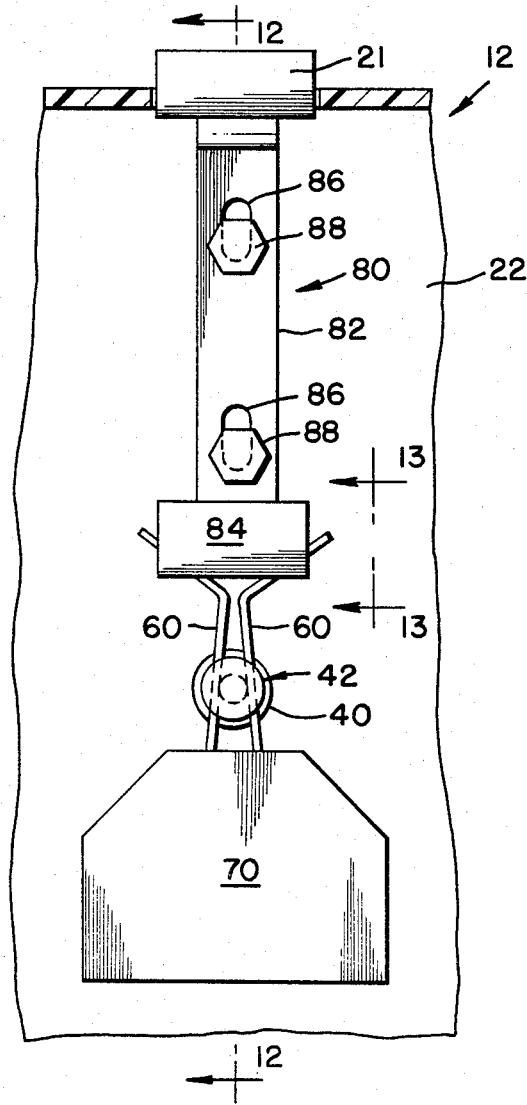
FIG. 8 is a back view of the end wall illustrated by FIG. 4, the second locking means and the manual operating means being shown in their first operative and latched positions, respectively.
Figure 13:
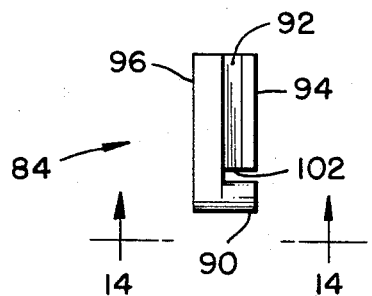
FIG. 13 is a view taken along viewing line 13—13 of FIG. 8.
Figure 14:
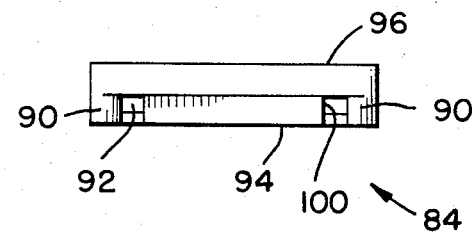
FIG. 14 is a view taken along viewing line 14—14 of FIG. 13.
Figure 9:
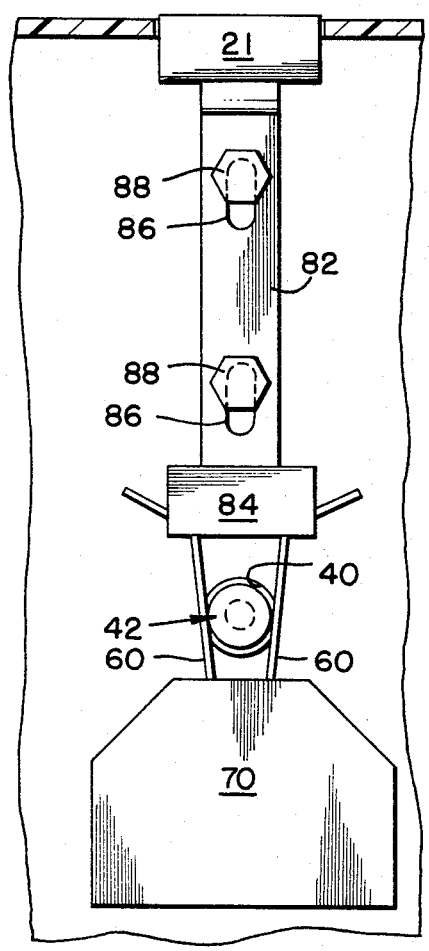
FIG. 9 is a view identical to FIG. 8, except in that the second locking means and the manual operating means are illustrated in their second operative and unlatched positions, respectively.
Figure 10:
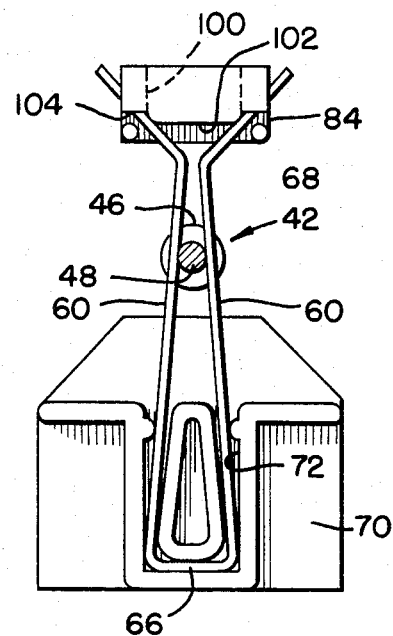
FIG. 10 is a view of back sides of the second locking means and the manual operating means relative to the front sides shown by FIG. 8.
Figure 11:
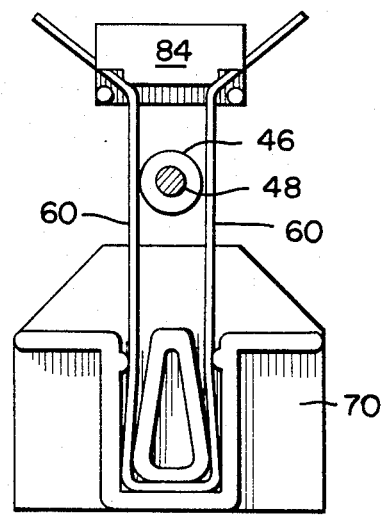
FIG. 11 is a view of the back sides of the second locking means and the manual operating means relative to the front sides shown by FIG. 9.

Referring to FIGS. 8-12, the unique locking arrangement of the present invention will be described. The wires 60 are two leg portions of a single spring wire element having a base portion 66 joining the two leg portions 60. The spring wire element is bent such that each leg element 60 forms an acute angle with the base portion 66 at the junction therewith. The spring wire element is bent at the other end of each leg portion 60 to provide a cam portion 68 forming an obtuse angle with the leg portion. The lower ends of the leg portions 60 and the base portion 66 are entrapped between a support plate 70 and the inner surface of the wall 22 in a channel 72 formed in the support plate 70, the support plate 70 being secured to the wall 22. The bends between the base portion 66 and the leg portions 60 and the resiliency of the spring member are such that spring member continuously biases the leg portions toward each other. When the groove 48 in the locking member 42 is axially aligned with the leg portions 60 as described above, the biasing action of the spring member forces the leg portions 60 into the groove as illustrated by FIGS. 8, 10 and 12. This position of the spring wire member and its leg portions may be conveniently referred to as a first operative position.

Referring now to FIGS. 8-11, 13, and 14, a manual operating means 80 is illustrated, the manual operating means 80 terminating at its upper end in the button 21 accessible from the upper surface of the receiver component 12. A slide portion 82 is secured to the button 21 and extends downwardly therefrom to a cam member 84 at the lower end of the operating means 80. The slide portion 82 has a pair of vertically elongated slots 86 therein, and guide and capturing means 88 extend through the slots 86 from the wall 22 to hold the slide portion 82 against the wall 22 while permitting vertical sliding motion of the slide portion 82 relative to the wall 22. More particularly, downwardly directed force on the button 21 will force the entire manual operating means downwardly from its normal position illustrated by FIG. 8 to the displaced position illustrated by FIG. 9. The total amount of vertical movement is limited by the vertical length of the slots 86. The cam member 84 receives the inclined cam portions 68 of the spring wire element between posts 90 and a groove 92 formed between posts 90 and a groove 92 formed between a back wall portion 94 and a front wall portion 96. The back surface 100 of the groove 92 and a lower wall 102 intersect to form a cam bearing surface 104 facing the post 90 with space therebetween for the inclined cam portion 68.

Let it now be assumed that the units have been assembled into an integrated unit with the leg portions 60 captured in the groove 48 of the locking member 42 as illustrated by FIGS. 8, 10 and 12. If substantial downward force is then applied to the button 21, the entire manual operating means will be forced downwardly from its latched position illustrated by FIG. 8, 10, and 12 to its unlatched position illustrated by FIGS. 9 and 11. As the cam member 84 is forced downwardly, force is applied through the cam bearing surfaces 104 to the cam portions 68 of the spring wire element. The inclination of the cam portions 68 causes the cam portion 68 to slide over the bearing surfaces 104 to spread the leg portions 60 to the position illustrated by FIGS. 9 and 11. In this position, the spacing between the leg portions 60 is greater than the diameter of the locking member 42, and the leg portions 60 have thus been forced out of the groove 48. As soon as the leg portions 60 are lifted out of the groove 48, the separating forces exerted on the distal ends of the studs 24 by the compressed pads 34 causes the groove 48 of the locking member 42 to be retracted from axial alignment with the wire portions 60. As a result, the components are separated for stand along operation as a result of simple depression of the button 21. When manual force on the button 21 has been released and the locking groove 48 has been retracted from axial alignment with the leg portions 60, the resilient biasing force of the spring wire element will cause its leg portions 60 to move back to the biased position of FIGS. 8 and 9. If the locking member 42 has not at such time been completely removed from the opening 40, the wire portions 60 will contact the cam portion 50 of the locking member 42 to further force separation of the components by applying a separation force directly on the locking member 42 and indirectly on associated speaker component. Moreover, as the leg portions 60 move to their normal biased position, contact on the bearing surface 104 by the cam portions 68 will cause the manual operating means 80 to return to its original latched position.

When it is desired to assemble the components into an integrated unit, the components 12, 14 and 16 are aligned horizontally as shown by FIG. 1, and the components are moved together horizontally along the relative directions indicated by the arrows. The studs 24 enter the recesses 32 and the locking member 42 enters the opening 40. The conical cam portion 50 of the locking member 42 engages the leg portions 60 and forces them apart to their second operative position. As force on the components continues, the groove portion 48 eventually becomes axially aligned with the leg portions 60, and the inherent biasing action of the spring wire member causes the leg portions 60 to snap into the groove 48. The components are then locked into an integrated unit. Moreover, since the leg portions 60 contact the interior of the end wall 22 and are therefor substantially supported along their length and no force is normally exerted on the leg portions 60 to bias them out of the groove 48, this support arrangment is capable of supporting relatively heavy speaker components 14 and 16 in a sag-free manner.

In addition to the features discussed heretofore, the studs 24 assure alignment of the assembled components. Since the recesses 32 are of only slightly larger diameter than the studs 24, relative movement between the components in the vertical, fore and aft, and rotational modes are effectively prevented when the components are assembled into an integrated unit. This arrangement substantially prevents sagging of heavy speakers since the stud-recess connection prevents relative movement in the vertical direction when the integrated unit is lifted by its central handle 18.

From the foregoing, it will be seen that the present invention provides in a portable stereo component system an improved mechanism for attaching and detaching speaker components. The quick attach-detach mechanism of the invention is easy to use and may be operated by one hand through simple operation of a button. The attachment mechanism is sturdy and is capable of holding large and heavy speakers in a sag-free manner. Moreover, the attachment arrangement is such that vibration, rattles, and buzzing between components and in the coupling are substantially prevented during operation of the stereo system as an integrated unit.

While the invention has been particularly shown and described with reference to a preferred embodiment thereof, it will be understood by those skilled in the art that various changes in form, details, and application may be made therein without departing from the spirit and scope of the invention. Accordingly, it is intended that all such modifications and changes be included within the scope of the appended claims.

What is claimed as new and is desired to secure by Letters Patent of the United States is:

1. In a portable audio apparatus including at least two components having separate housings, a quick attach-detach mechanism for selectively locking the components into a substantially rigid and vibration free integrated unit and selectively releasing the components for stand-alone operation, said quick attach-detach mechanism comprising:

a plurality of studs projecting from a first one of said housings along spaced-apart parallel axes, resilient means on a second one of said housings located thereonto abut the distal ends of said studs when the components are positioned to form an integrated unit, said resilient means being resiliently compressible along the axes of said studs, a first locking means projecting outwardly from a selected one of said first and second housings along an axis parallel to the axes of said studs at least when the components are positioned to form an integrated unit, and first locking means having detent means thereon, a second locking means carried by the non-selected one of said first and second housings, said second locking means having a first operatve position adapted to engage said detent means only when the components are positioned to form an integrated unit with said resilient means substantially compressed to apply separating forces on said studs along the axes of said studs, and said second locking means having a second operative position adapted to avoid engagement with said detent means in all relative positions of the components, and manual operating means movable between a latched position and an unlatched position, said manual operating means coupled to said second locking means such that said second locking means is in its first operative position when said manual operating means is in its latched position and said second locking means is in its second operative position when said manual operating means is in its unlatched position, said second locking means and said manual operating means being normally biased toward said respective first operative and latched positions, whereby manual movement of said manual operating means to its unlatched position when the components comprise an integrated unit will move said second locking means to its second operative position to disengage said first locking means and permit separation of the components as a result of the separating forces exerted on the distal ends of said studs by said resilient means.

2. A quick attach-detach mechanism as defined by claim 1 in which said first locking means comprises a cylindrical member having a peripheral groove therein forming said detent means, said second locking means in its first operative position being disposed in said groove when the components are positioned to form an integrated unit to prevent relative movement of said first locking means and said housings along the axis of said first locking means, and said second locking means in its second operative position disposed radially outwardly of said cylindrical member to permit relative movement of said first locking means and said housings along the axis of said first locking means.

3. A quick attach-detach mechanism as defined by claim 2 in which said cylindrical member terminates at its distal end in cam means adapted to engage said second locking means as the components are moved along the axis of said first locking means toward their positions to form an integrated unit to move said second locking means from its first operative position to its second operative position, whereby when the components reach a position in which said second locking means is axially aligned with said groove said second locking means may enter said groove under the influence of the normal biasing force thereon.

4. A quick attach-detach mechanism as defined by claim 2 in which said second locking means comprises an elongated resilient member secured in a fixed position at one end thereof to the non-selected one of said first and second housings, said elongated member in said first operative position being in a substantially unflexed state and in said second operative position being in a substantially flexed state, the resiliency of said elongated member biasing said elongated member from its second operative position toward its first operative position.

5. A quick attach-detach mechanism as defined by claim 4 in which the coupling between said second locking means and said manual operating means comprises complementary cam means on said elongated member and said manual operating operating means arranged succ that the resiliency of said elongated member biases said manual operating means toward its latched position and manual movement of said manual operating means to its unlatched position moves said elongated member to its substantially flexed second operative position.

6. A quick attach-detach mechanism as defined by claim 5 in which said elongated member comprises a pair of wire elements adjacent each other in said first operative position and substantially spaced apart in said second operative position.

7. A quick attach-detach mechanism as defined by claim 6 in which said cylindrical member terminates at its distal end in cam means adapted to engage said pair of wire elements as the components are moved along the axis of said first locking means toward their positions to form an integrated unit to move said wire elements from said first operative position to said second operative position, whereby when the components reach a position in which said wire elements are axially aligned with said groove said wire elements may enter said groove under the influence of the normal biasing force thereon.

8. A quick attach-detach mechanism as defined by claim 1 in which the lengths of said studs and said first locking means and the maximum deflection of said resilient means are selected to preclude contact between other portions of said first and second housings when the components are positioned to form an integrated unit.

9. A quick attach-detach mechanism as defined by claim 1 further comprising a plurality of cylindrical recesses in the second one of said housings each sized and positiond thereon to receive the distal end of a respective one only of said studs when the said components are positioned to form an integrated unit, said resilient means comprising a plurality of pads each positioned within a respective one of said recesses.

10. A quick attach-detach mechanism as defined by claim 9 in which said first locking means comprises a cylindrical member having a peripheral groove therein forming said detent means, said second locking means in its first operative position being disposed in said groove when the components are positioned to form an integrated unit to prevent relative movement of said first locking means and said housings along the axis of said first locking means, and said second locking means in its second operative position disposed radially outwardly of said cylindrical member to permit relative movement of said first locking means and said housing along the axis of said first locking means.

11. A quick attach-detach mechanism as defined by claim 10 in which said second locking means comprises an elongated resilient member secured in a fixed position at one end thereof to the non-selected one of said first and second housings, said elongated member in said first operative position being in a substantially unflexed state and in said second operative position being in a substantially flexed state, the resiliency of said elongated member biasing said elongated member from its second operative position toward its first operative position.

12. A quick attach-detach mechanism as defined by claim 11 in which the lengths of said studs and said first locking means and the maximum deflection of said resilient means are selected to preclude contact between other portions of said first and second housings when the components are positioned to form an integrated unit.

* * * * *